INVENTOR.
THOMAS D. ENGLISH

BY

ATTORNEY

July 15, 1969 T. D. ENGLISH 3,456,247

COUPLED FILM STORAGE DEVICE

Filed Jan. 14, 1966 4 Sheets-Sheet 3

July 15, 1969 T. D. ENGLISH 3,456,247

COUPLED FILM STORAGE DEVICE

Filed Jan. 14, 1966 4 Sheets-Sheet 4

United States Patent Office 3,456,247

Patented July 15, 1969

3,456,247

COUPLED FILM STORAGE DEVICE

Thomas D. English, Yorktown Heights, N.Y., assignor to International Business Machines Corporation, Armonk, N.Y., a corporation of New York Filed Jan. 14, 1966, Ser. No. 520,605
Int. Cl. G11b *5/30*
U.S. Cl. 340—174 9 Claims

ABSTRACT OF THE DISCLOSURE

The magnetic film memory is formed of coupled anisotropic magnetic film strips which provide flux closure along the hard axes of the films. The word drive lines are arranged between the film strips and extend in the same direction as the film strips. The digit drive lines are external to the coupled film structure. A hard axis bias field is applied by a coil or external bias conductor in the same direction to both film strips. The entire structure is mounted over a ground plane. The hard axis bias field adds to the word conductor field in the vicinity of the lower magnetic film strip next to the ground plane and subtracts from the word conductor field in the vicinity of the upper magnetic film strip.

The present invention relates to magnetic thin film storage devices and more particularly to an improved coupled film storage device and memories.

Magnetic thin film storage devices have been fabricated in a variety of different forms in an attempt to realize to the fullest the advantages of high speed switching and mass fabrication which these devices offer. Film storage devices have been fabricated with a single film forming the storage medium. The films are fabricated to exhibit uniaxial anisotropy, that is a preferred axis or direction, termed an easy axis, along which the magnetic moments are oriented in the absence of a magnetic field. Single film structures of this type have been employed in film memories but because of the fact that these devices are open flux path structures, many difficulties are encountered. For example, each film storage device in a memory of this type produces, due to its own magnetization, a stray field which can affect the operation of neighboring films. At the same time the magnetization in each film produces a demagnetizing field which tends to destroy the magnetic orientation in the film. In order to alleviate these difficulties following from the open flux path structure of single film storage devices, film memories have been fabricated using coupled films which provide substantially closed flux path storage devices. Though as is suggested in an article entitled "Future Development in Large Magnetic Memories" by J. I. Raffel which appeared in the Journal of Applied Physics, vol. 35, No. 3, March 1964, pp. 748–753, coupled film structures can be constructed with flux closure in the easy axis direction, the hard axis direction or in both directions, the primary emphasis has been on memories fabricated of coupled films with easy axis closure. One example of an improved film memory of this type is found in copending application Ser. No. 364,982, filed May 5, 1964 on behalf of O. Voegli and assigned to the assignee of the subject application. Memories constructed with devices of this type are free of many of the difficulties of single film memories but still require relatively significant word current signals during both writing and reading operations since no flux closure path is provided in the hard axis direction in which the word field is applied. Further though this type of structure allows the digit lines in the memory to be closely spaced, the spacing between adjacent word lines is still relatively large.

In accordance with the principles of the present invention an improved coupled film memory is provided which can be operated with small word line signals, which has closely spaced word lines and therefore a high density of storage positions along the digit lines and in which the storage devices have relatively large operating tolerances so that satisfactory storage devices for the memory can be fabricated with a high yield. As is illustrated in the embodiments of the invention disclosed herein these advantanges are realized by using a coupled film structure providing flux closure along the hard axes of the coupled films. The word drive line is arranged between the coupled films. The digit drive line is external to the coupled film structures. Further a bias field in the hard axis direction is applied to the coupled films by a coil or conductor external to the coupled film structure. It has been discovered that this bias field, though it adds to the word field in the vicinity of one of the coupled films and opposes the word field in the vicinity of the other of the coupled films actually lowers the current requirements on the word drive line by as much as half. Further, storage devices of this type have been found to operate within a larger range of tolerances when the hard axis bias field is applied. The reduction in word line current is significant because the magnitude of the current which must be applied to a word drive line for a magnetic film memory is much greater than that which must be applied to the digit drive lines and by lowering the word current requirements it is possible to use less expensive, lower power drive circuits to control the entire memory.

Therefore it is an object of the present invention to provide improved magnetic field storage devices and memories.

It is a further object to provide coupled film storage devices and memories which can be operated with small word line currents.

It is a further object to provide an improved coupled film memory which can be operated completely by relatively inexpensive, low power drive circuits.

It is a further object to provide an improved magnetic thin film memory wherein a large number of storage devices can be controlled by each digit line.

The foregoing and other objects, features and advantages of the invention will be apparent from the following more particular description of preferred embodiments of the invention as illustrated in the accompanying drawings.

Figure 1:
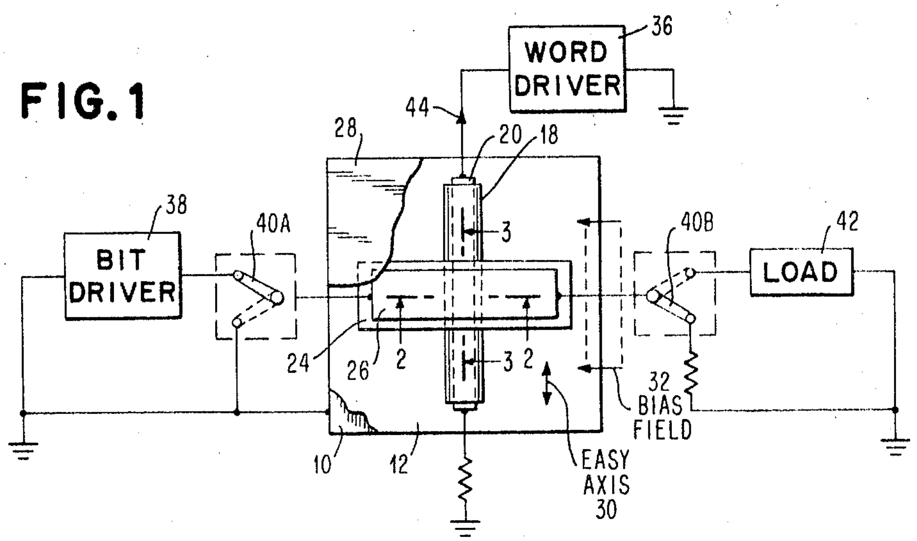
FIG. 1 is a plan view of an embodiment of a magnetic thin film storage device constructed in accordance with the principles of the present invention.
Figure 2:
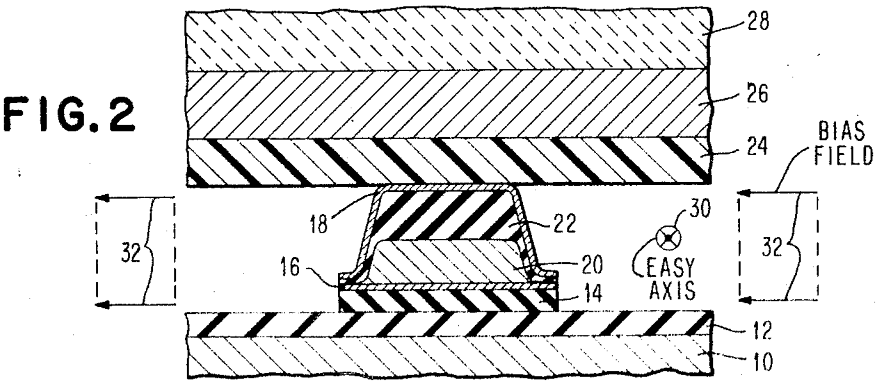
FIGS. 2 and 3 are sectional views of the structure of FIG. 1.
Figure 3:
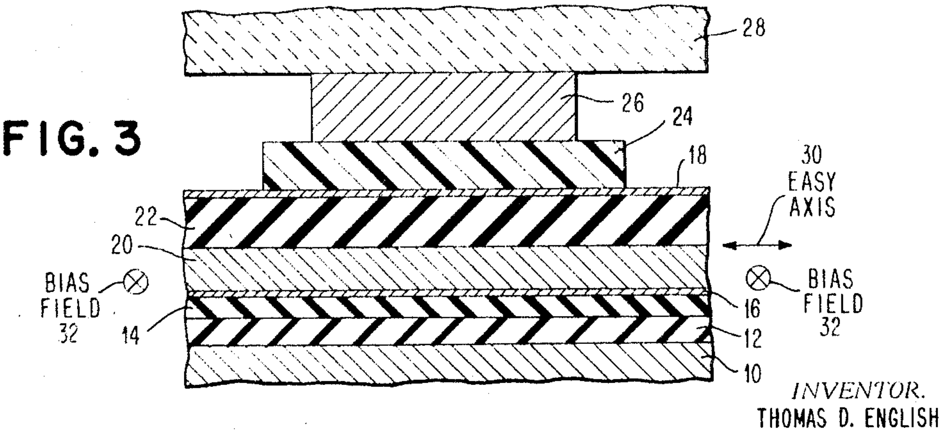

Referring now to FIG. 1 there is shown an embodiment of a single magnetic thin film storage device constructed in accordance with principles of the present invention. This storage device as can be more clearly seen in the sectional views of FIGS. 2 and 3 is formed of a plurality of layers of conductive insulating, and magnetic material which are deposited on a ground plane designated 10. The first of these layers are two successive layers of insulating material 12 and 14. The insulating layer 12 is formed of a polymer which has good insulating qualities and the insulating layer 14 is formed of silicon oxide which besides being an insulator can be deposited so that its upper surface is relatively smooth and therefore provides a proper base on which a subsequent layer 16 of magnetic material can be vacuum deposited. Layer 16 forms one half of a coupled film storage structure the other half of which is formed of a layer 18 which is separated from layer 16 by a conductive layer 20, which forms the word drive line for the device, and an insulating layer 22 separating word drive line 20 from the upper film 18 of the magnetic film storage device.

Above magnetic film 18 there is placed a further layer 24 of insulating material which separates film 18 from a second conductor, which is called a digit conductor and serves both as a digit driver and a digit sense line for the device. Above this conductor 26 there is provided a magnetic keeper 28 which is formed of ferrite material and provides a flux closure path for stray flux produced during the operation of the magnetic thin film storage device.

The thin magnetic films 16 and 18 which form the coupled film storage device are formed so that they have uniaxial anisotropic properties. The easy axes of these films, indicated by arrow 30, are in a direction parallel to the direction in which the word drive line 20 extends and is perpendicular to the direction in which the digit conductor 26 extends. The magnetization in both films is oriented along the easy axis in the absence of an applied field. Information is selectively stored in the coupled films 16 and 18 by causing the magnetic moments to be oriented in one or the other direction along the easy axis of these films. A binary one is considered to be stored when the magnetic moments are oriented to the right in both films 16 and 18 viewed in FIG. 3. A binary zero is considered to be stored when the magnetic moments in both films are oriented to the left.

In the operation of the film storage device of the subject invention a continuous hard axis or orthogonal bias field, indicated by arrows 32, is applied in a direction perpendicular to the easy axis. Therefore, the magnetic orientation in the binary one and zero states is not exactly parallel to the easy axis but is actually rotated somewhat away from the easy axis by the hard axis bias field. The magnitude of the bias field is less than the field necessary to be applied in the hard axis direction to affect a permanent change in the orientation of the magnetic moments in films 16 and 18. Therefore, the rotation of the magnetic moments when in the quiescent state storing either a binary one or zero is relatively small, for example, in the order of twenty degrees. When in this quiescent storage state the arrangement of the coupled films 16 and 18 is such, extending continuously above and below the word line 20 with the magnetization in both films oriented in the same direction rotated slightly from the easy axis direction, that the films do not provide flux closure paths for each other. Rather as is shown most clearly in FIG. 2, the films 16 and 18 provide flux closure paths for each other along the hard axis of the films, that is in a direction essentially at right angles to the easy axes of these films. Even though the bias field produces some rotation away from the easy axis when the films are in a quiescent storage state, this rotation is slight, and the films themselves form an essentially open flux structure when in this condition. However, the keeper 28 provides flux closure for the films when in the quiescent storage state. It is for this reason that the moments in both films are oriented in the same direction when in a quiescent storage state and not in opposite directions as is the case in those structures where the films provide flux closure paths for each other along their easy axes.

Reading and writing operations in the storage device of FIGS. 1, 2 and 3 are accomplished under control of signals applied to the word drive line 20 by a word driver 36, and to the digit line 26 by a bit driver 38. Digit line 26 also serves as a sense line, and the particular function to be performed by this line is controlled by the position of a pair of switches designated 40A and 40B. These switches are in the full line position shown to connect line 26 to the bit driver 38 during a write operation and are transferred to the dotted position during a read operation to connect line 26 to a load 42.

During a write operation word driver 36 applies to word drive line 20 a signal in the direction indicated by an arrow 44 to cause the word drive line to apply to coupled films 16 and 18 a hard axis field sufficient to exceed the uniaxial anistropy field for the films. The bias field indicated by arrows 32 interacts with this word field in a manner to be described in detail below with reference to FIGS. 4A, 4B, 4C, but it suffices for the present to state that prior to the termination of the hard axis word field a digit drive signal is applied by a bit driver 38 through switches 40A to bit drive line 26. The polarity of this signal determines the direction of the easy axis field which is applied to films 16 and 18 and therefore whether a binary one or a binary zero is to be written. The digit drive signal is terminated after the word drive signal is terminated to cause the moments in both films 16 and 18 to be oriented either to the right as viewed in FIG. 3 to store a binary one or to the left to store a binary zero.

Read out operations may be either destructive or nondestructive. A destructive read out may be carried out during the first part of the operation described above in which case the switches 40A and 40B are initially in the dotted position when the word signal is applied by word driver 36 to word drive line 20. The resulting hard axis field rotates the moments in both films from the easy to the hard direction producing a flux change which is sensed by digit line 26. The polarity of the signal induced on line 26 indicates whether a binary one or zero was stored and the output is taken across load 42. Once this output is realized the switches 40A and 40B are transferred to the full line position to allow bit driver 38 to apply a digit input signal which is terminated after the word drive signal and controls by its polarity the writing of either a binary one or a binary zero.

Nondestructive read out is accomplished by controlling word driver 36 to apply to word line 20 a smaller signal which produces a hard axis field sufficient to rotate the magnetic moments in films 16 and 18 and induce an output on line 26, but not sufficient to cause the threshold for these films to be exceeded. Upon termination of this signal the films return to their original storage condition.

Each of the above described operations can be performed without the use of a hard axis bias field 32, but the application of this field greatly improves the over-all performance in lowering the size of signals which need be applied to the word drive line and in enlarging the operating tolerances of the devices so that large numbers of the devices can be fabricated for use in large memories with a high yield.

Figure 4A:
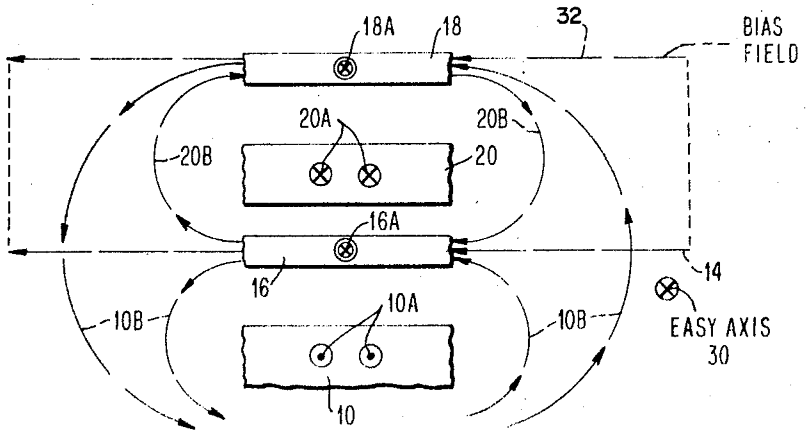
FIGS. 4A, 4B and 4C are partly schematic views of the embodiment of FIG. 1 illustrating the manner in which the magnetic fields interact during the operation of the storage device.
Figure 4B:
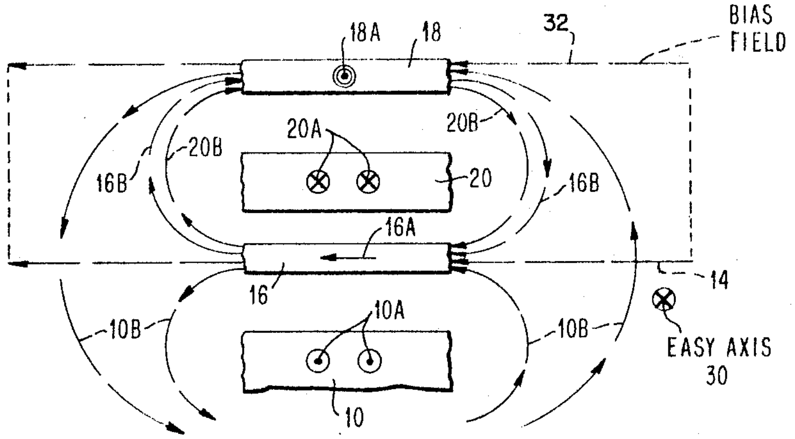
Figure 4C:
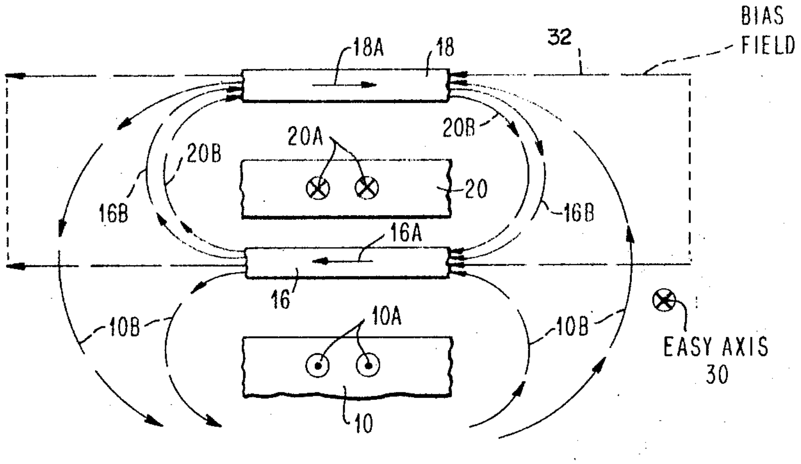

The manner in which this bias field interacts with the fields applied by word drive line 20 is illustrated in FIGS. 4A, 4B and 4C. Each of these figures is a view taken in the same direction as that of FIG. 2, in which only four of the elements of the device are shown and these somewhat schematically. These four elements are the ground plane 10, the word drive line 20 and the upper and lower films 16 and 18 which are shown without the other layers shown in FIGS. 1, 2 and 3 in order to more clearly depict the interacting fields produced during the operation of the device.

FIG. 4A indicates the current, magnetic field and magnetization directions when a word conductor 20 is initially energized with a current in a direction into the paper as indicated at 20A in FIG. 4A (the direction of arrow 44 in FIG. 1) when the films 16 and 18 are storing a binary one. When in this storage state the magnetization in both films is in a direction into the paper as indicated at 16A and 18A in FIG. 4A, which corresponds to magnetization to the right in FIG. 3. The magnetization in these films is rotated away from the easy axes of the films by the hard axis bias field represented by arrows 32 as explained above. When the word current indicated at 20A is applied, a magnetic field is produced as represented at 20B. This field is applied to both films 16 and 18 and tends to rotate the magnetization in both films to the hard direction. However, when the current 20A is applied to conductor 20, an image current flowing in the opposite direction is produced in ground plane 10. This current represented at 10A produces a magnetic field indicated at 10B which is also applied in the hard axis direction to both films 16 and 18. If the effect of the bias field 32 is ignored for the moment and the operation be considered as if this field were not present, the reason why the application of this field significantly improves the device performance will be more readily understood.

From the diagram of FIG. 4A it is apparent that the fields 20B and 10B are additive in the vicinity of the lower film 16 and substrative in the vicinity of the upper film 18. It is further apparent that initially, since the films 16 and 18 are coupled in the hard direction and not in the easy direction, there is no significant demagnetizing field from one film being applied to the other film. As a result of the fact that the fields 10B and 20B add in the vicinity of lower film 16, the magnetization in this film is switched to the hard direction first as indicated at 16A in FIG. 4B. When this switching occurs the magnetization 16A in film 16 produces a demagnetizing field 16B which is applied as indicated to upper film 18. This field adds to the field 20B provided by the word current 20A in word drive line 20 to accelerate the switching of the magnetization 18A in film 18 to the hard axis direction indicated in FIG. 4C.

From the above description it can be seen that even in the absence of the bias field, the application of a current to word drive line 20 results in a more intense magnetic field being initially applied to the lower film 16 which is located between the word drive line and the ground plane 10. The lower film therefore switches first and once switched provides a demagnetizing field which aids the word field 20B and causes the upper film to switch.

Particular note should be made of the fact that the bias field is what may be termed an externally applied bias field and is applied in the same direction to both films 16 and 18. Thus the bias field aids to the word drive field 20B in the vicinity of lower film 16 and opposes the word drive field in the vicinity of upper film 18. Though one might expect that whatever advantage the additive bias field provides in the switching of the lower film for example in reducing word drive line current requirements, would be balanced by disadvantages resulting from the substrative bias fields applied in the vicinity of upper film 18, this is not the case. This is due to the fact that, as explained above, both films need not switch together to the hard axis direction. The lower film 16 switched first and the demagnetizing field from this film aids in the switching of the upper film. The operation of the device is therefore critically dependent on this initial switching of lower film 16 to the hard direction and bias field 32 is applied in a direction to accomplish this result. Thus the advantages of the hard axis bias field are realized without the necessity of applying this field so that it adds to the word line field in the vicinity of both films which can only be achieved by applying a bias signal continuously to the word driver or a bias line arranged between the films. This type of arrangement would necessarily result in either greater spacing between the films 16 and 18 which, of course, would result in larger power dissipation, or large direct current heating produced by bias current continuously flowing through the very thin word drive line.

It should be further noted that the switching operation described above does not require that the two films 16 and 18 be fabricated to have different magnetic characteristics. Though this type of construction is possible, the two films may, as in the preferred embodiments disclosed herein, be fabricated with essentially the same thickness and same magnetic characteristics.

The device of FIG. 1 is advantageous not only in that it can be operated with low word drive line currents, but also in that in the ultimate environment in which it is to be used, that is a large scale memory, the bias field enlarges the parameters for acceptable operation so that large numbers of the devices can be mass fabricated with a high yield of devices meeting the memory requirements. Of course, since flux closure is provided in the hard axis direction the spacing between word lines on a memory fabricated with these devices can be less than with conventional film memories, though the open flux structure in the easy axis direction necessitates somewhat larger spacing between the digit lines than is necessary in coupled film memories designed to have easy axis flux closure.

Figure 5:
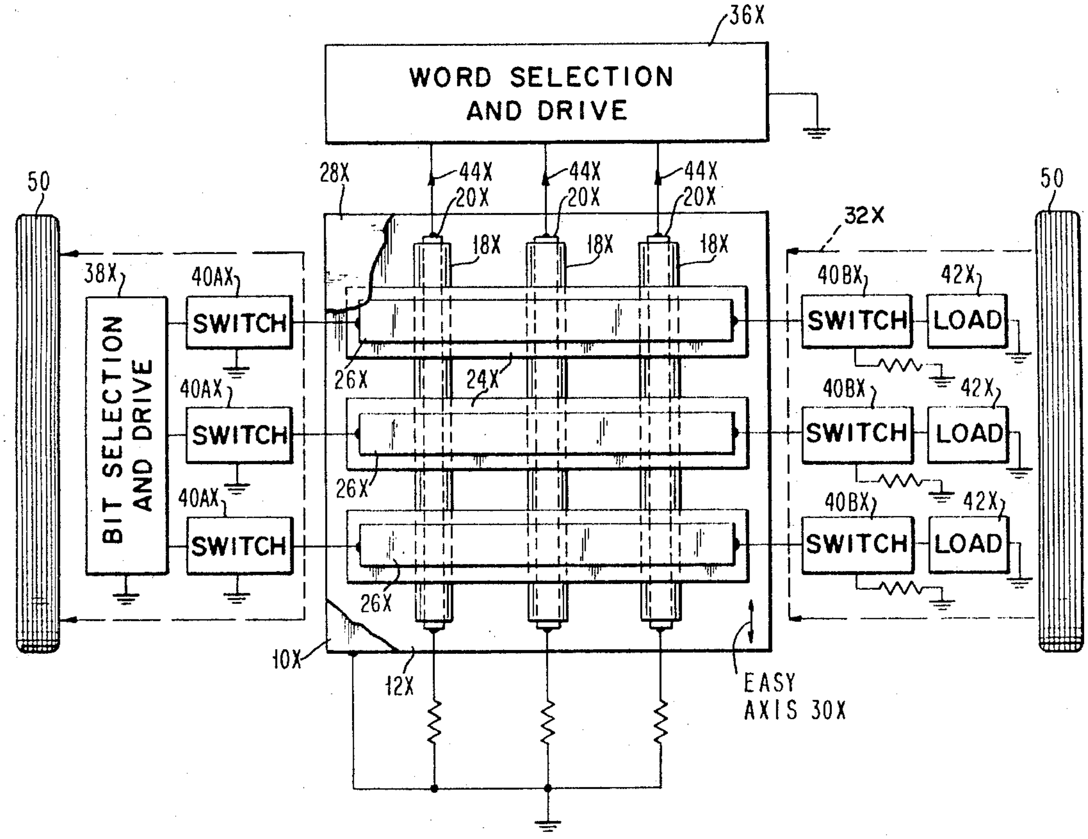
FIGS. 5 and 6 show two embodiments of magnetic film memories constructed in accordance with the principles of the present invention with different structures for applying the hard axis bias field to the storage elements of the memories.

FIG. 5 is an embodiment of a three by three memory matrix fabricated in accordance with the principles of the invention, it being of course realized that most commercial memories would include many more storage positions. In FIG. 5 reference characters used to identify the various components correspond to those used in FIG. 1 with the addition of the letter X. The memory includes three word drive lines 20X controlled by word selector and drive circuitry 36X and three digit ilnes 26X connected through switches 40AX and 40BX to bit selector and drive circuitry 38X and output loads 42X. The individual storage devices of the memory are formed at the intersections of the digit lines 26X and word lines 20X. Particular note should be made of the fact that the upper films 18X and lower films, corresponding to film 16 of FIGS. 2 and 3 which are not seen in the view of FIG. 5, extend together continuously along the length of the word line thereby further limiting the word line current requirements. The bias field represented at 32X is applied as shown by external coils 50. This field is in a direction to add to the word line field in the vicinity of the lower film of each coupled film storage device. The memory is operated in a conventional two dimensional mode to write information in the storage devices and read the stored information out in either a destructive or a nondestructive mode.

Figure 6:
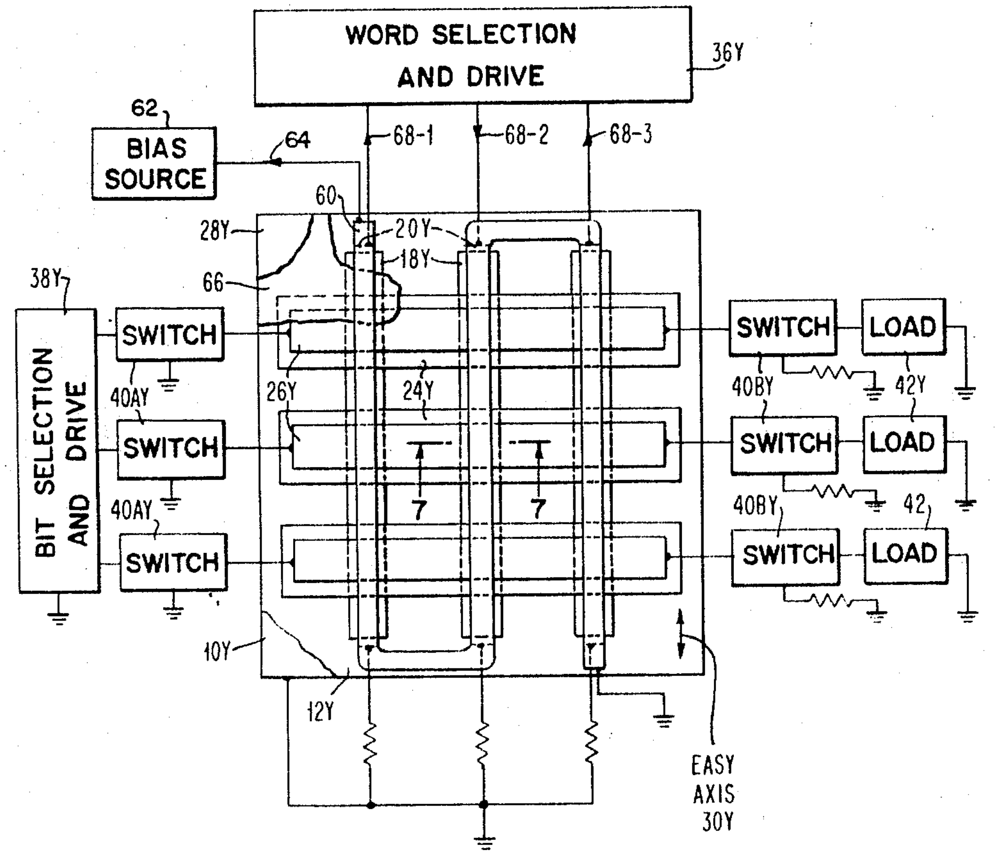

FIG. 6 is a further embodiment of the invention which differs from that of FIG. 5 only in the manner in which the bias field is applied. This figure uses the same reference character as has been used above with the letter Y appended. The hard axis bias field is applied in the embodiment of FIG. 6 by a bias conductor 60 which is arranged to extend longitudinally above the word drive line 20Y. Conductor 60 is continuously energized with current supplied by a signal source 62 and this current flows in the direction indicated by arrow 64. As is more clearly shown in the sectional view of FIG. 7 conductor 60 is arranged between the magnetic keeper layer 28Y and the digit line 26Y and is separated from the digit line by a layer of insulating material 66. The current direction in the bias conductor 60 with the physical arrangement shown in FIG. 6 is different in adjacent word lines. The current supplied to the middle word drive line 20Y by the word selection and drive circuit 36Y must be in the same direction as the bias field 32Y to add to the word drive field in the vicinity of the lower film 16Y of each storage element. Thus as is indicated by the three arrows 68–1, 68–2 and 68–3 the current supplied to the middle word drive conductor 20Y is in an opposite direction to that supplied to the outer two word drive conductors 20Y. In all other respects the operation is the same as for the coupled film storage elements and arrays described above.

Figure 7:
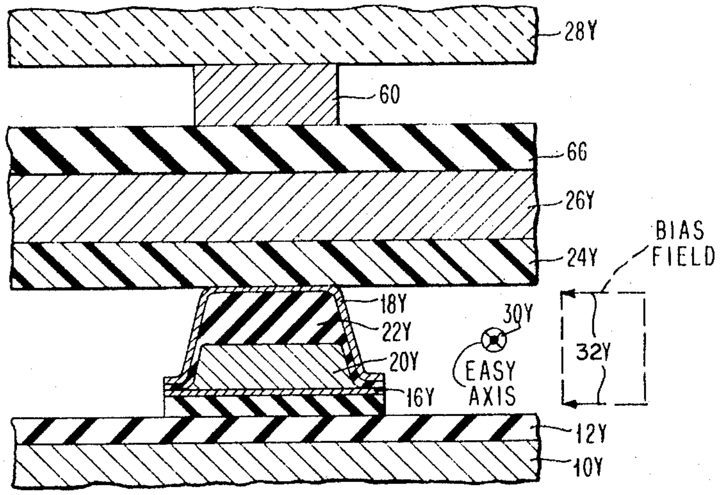
FIG. 7 is a sectional view of one of the storage elements in the memory of FIG. 6.

It should be noted that the bias conductor 60 in the embodiment of FIG. 6 is external to the coupled film element of the embodiment of FIGS. 6 and 7 and may be made thicker if desired to reduce heat losses without affecting the spacing between the coupled films 16Y and 18Y.

Further in both the embodiments of FIG. 5 and FIG. 6 which are not drawn to scale, the word line conductors may be spaced very close to each other since the upper and lower films 16 and 18 provide an essentially closed flux path around these conductors thereby eliminating stray flux. As a result of this close spacing between word line the density of storage positions along the digit line is increased, and a larger number of storage positions can be controlled by a relatively short digit line. Further the thickness of the digit line which is external to the coupled films can be increased to further decrease the resistance of this line without affecting the spacing between the coupled films. These are important considerations in many memory applications which require a much larger number of storage positions along each digit line than are required along each word line.

Though the above described increased density of storage positions along the digit lines and reduction in digit line resistance which are achieved with the memories of the present invention are accompanied by an increase in required bit line current and in spacing of storage positions along the word lines when compared to memories using films with easy axis closure, the advantages outweigh the disadvantages in most memory applications. This is due to the fact that most memories require that each digit line control a larger number of storage positions than each word line, and the further fact that the word line current requirements are much higher than the digit line current requirements. Thus a 512 by 288 bit memory fabricated of coupled films providing easy axis flux closure would include 512 storage positions along each digit line and 288 storage position along each word line and require word currents of about 200 milliamps and digit currents of about 15 milliamps. In a memory of this type constructed in accordance with the principles of the present invention the digit lines are much shorter than the digit lines in prior art memories of the same size and the word line current requirements are reduced to below 100 milliamps while the digit line requirements are increased to only 50 milliamps. Thus both sets of lines can be driven with relatively inexpensive, low cost drive circuits.

Since the packing density along the digit line is enhanced in memories constructed in accordance with the principles of the present invention, a shorter digit line can be used to drive a given number of storage positions thereby minimizing resistance heating losses and pulse transmission delays. Hence the cycle time of the memory is improved. Further since the digit line is not between the coupled films, it can be made thicker and can be spaced from the films and ground plane by a relatively large distance. As a result both the attentuation of the sense output signals induced on the line and the distortion of the digit drive signals can be minimized.

While the invention has been particularly shown and described with reference to preferred embodiments thereof, it will be understood by those skilled in the art that various changes in form and detail may be made therein without departing from the spirit and scope of the invention.

What is claimed is:

1. A coupled film magnetic storage device of the type including first and second anisotropic magnetic thin films each having an easy axis and a hard axis and a drive conductor arranged to extend between said films for selectively applying magnetic fields to said films and wherein the easy axis of said films are parallel to each other and essentially perpendicular to the magnetic fields applied by said drive conductor so that said films provide flux closure paths for each other in the hard axis direction in which said magnetic fields are applied;

the improvement comprising means external to said coupled film structure for applying a biasing magnetic field in the hard axis direction to both said magnetic films which adds to the magnetic fields applied by said drive conductor to said first film and opposes the magnetic fields applied by said drive conductor to said second film.

2. The coupled film storage device of claim 1 wherein said first film, said drive conductor, and said second film are arranged one above the other, and said device includes a ground plane arranged adjacent to said first film.

3. The coupled film storage device of claim 1 wherein said bias means includes a conductor arranged external to the coupled film structure formed by said first and second films and said drive conductor.

4. The coupled film magnetic structure of claim 1 including a second conductor arranged external to the coupled film structure formed by said first and second films and said first conductor;

and means for energizing said second conductor to apply easy axis fields either in one direction to both said films or in an opposite direction to both said films and operable in conjunction with said fields applied by said bias means and said first conductor to cause said first and second films to assume either a first stable storage state with the magnetization in both films oriented in one direction or a second stable storage state with the magnetization in both films oriented in an opposite direction.

5. A coupled film storage device comprising:

(a) a ground plane, a first anisotropic magnetic thin film, a first conductor, a second anisotropic magnetic thin film, and a second conductor arranged one above the other in the order recited;

(b) said first and second films each having an easy axis and a hard axis and being arranged with the easy axis of said films in parallel and providing flux closure paths for each other in the hard axis direction;

(c) means for energizing said first conductor between said films with current to apply a hard axis field to both said films with said hard axis field being applied in a first direction to said first film and an opposite direction to said second film;

(d) means for energizing said second conductor with current to apply easy axis magnetic fields to both said films;

(e) and bias means for applying a hard axis biasing magnetic field to both said films in said first direction.

6. The coupled film storage device of claim 5 wherein said bias means includes a further conductor arranged above said second conductor.

7. A magnetic thin film storage device comprising;

(a) first and second continuous strips of thin film magnetic material arranged one above the other and both extending longitudinally in a first direction;

(b) a word conductor arranged between said first and second strips of magnetic material and extending longitudinally in said first direction;

(c) said strips of magnetic material having anisotropic properties and exhibiting hard and easy axes of magnetization;

(d) the easy axis of both said strips extending in said first direction, and said strips providing flux closure paths for each other in the hard axis direction;

(e) means for energizing said word conductor with current in said first direction to apply a hard axis magnetic field to both said strips;

(f) bias means for applying a hard axis biasing magnetic field to both said films;

(g) said bias field being applied in the same direction to both said films and aiding the field applied by said word conductor to said first film and opposing the field applied by said word conductor to said second film;

(h) a ground plane adjacent to said first film;

(i) a plurality of spaced digit conductors extending adjacent to said second film strip in a direction essentially perpendicular to said first direction;

(j) and means for energizing said digit conductors to apply easy axis fields to said film strip.

8. A magnetic thin film memory comprising:

a ground plane;

a first plurality of magnetic thin film strips arranged above said ground plane extending in parallel spaced relationship in a first direction;

a plurality of word conductors extending in parallel spaced relationship in said first direction with each said word conductor being arranged above a corresponding one of said film strips in said first plurality;

a second plurality of magnetic thin film strips extending in parallel spaced relationship in said first direction with each strip arranged above a corresponding one of said word conductors and forming with this corresponding film strip beneath the word conductor a coupled film structure around the word conductor;

a plurality of digit conductors extending in parallel spaced relationship in a second direction perpendicular to said first direction above said second plurality of magnetic thin film strips;

each of said film strips having anisotropic properties and each having its easy axis in said first direction and its hard axis in said second direction and said strips providing flux closure paths for each other in the hard axis direction;

means for selectively energizing said word conductors and said digit conductors;

and bias means external to said coupled film structures formed by said word conductors and first and second film strips for applying a hard axis bias field to said film strips.

9. The invention of claim 8 wherein said bias means includes a bias conductor extending in said first direction above each of said coupled film structures.

References Cited

UNITED STATES PATENTS

| | | | |
|---|---|---|---|
| 3,320,597 | 5/1967 | Hart | 340—174 |
| 3,375,503 | 3/1968 | Bertelsen | 340—174 |

BERNARD KONICK, Primary Examiner

GARY M. HOFFMAN, Assistant Examiner